April 20, 1954 A. L. W. WILLIAMS 2,676,212

MAGNETIC RECORDING AND REPRODUCING

Filed Aug. 20, 1948 4 Sheets-Sheet 1

INVENTOR
ALFRED L. W. WILLIAMS
BY Eber J. Hyde
ATTORNEY

INVENTOR
ALFRED L. W. WILLIAMS
BY Elmer J. Hyde
ATTORNEY

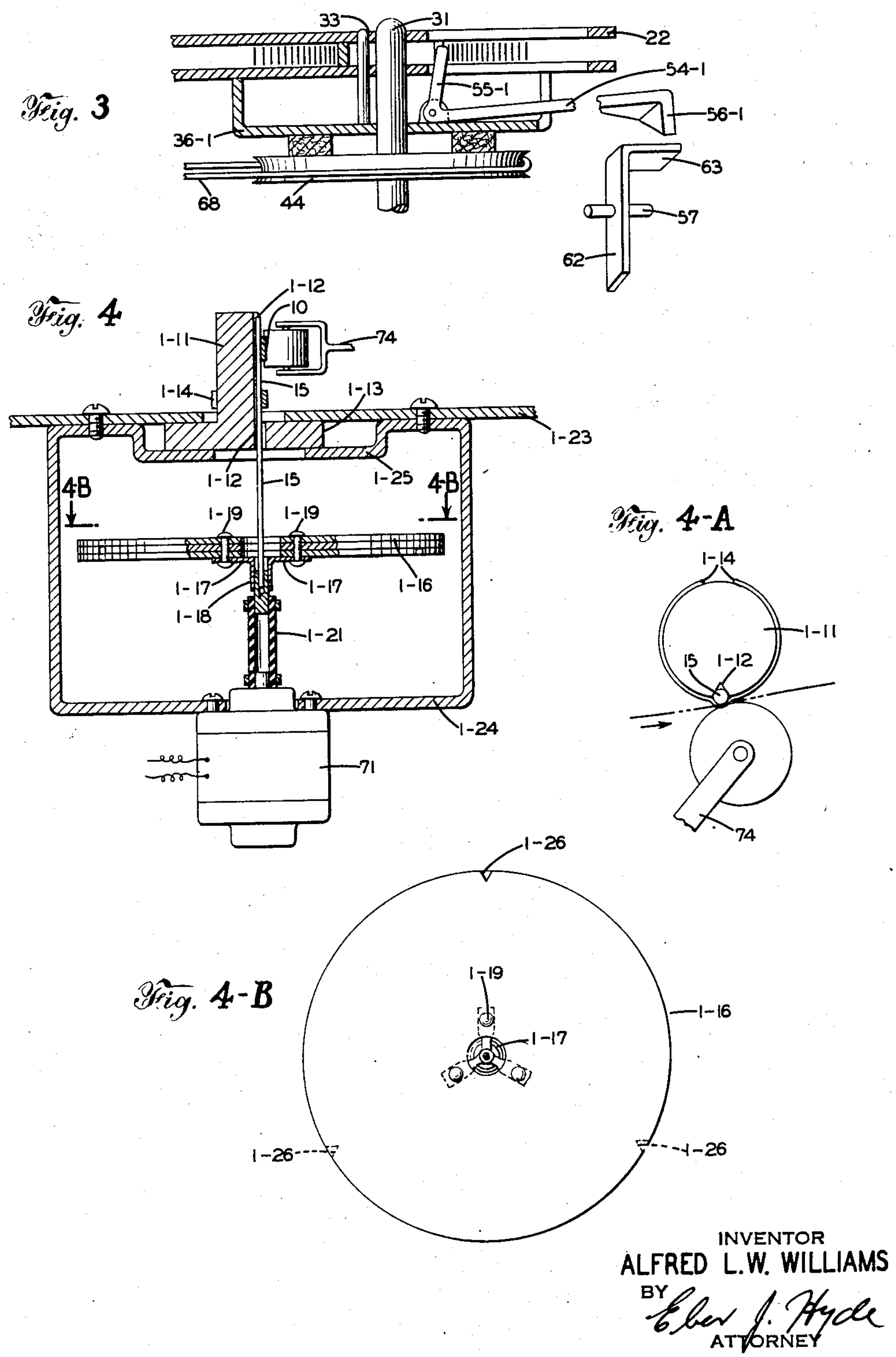
Fig. 3, Fig. 4, Fig. 4-A, Fig. 4-B
INVENTOR
ALFRED L.W. WILLIAMS
BY Elver J. Hyde
ATTORNEY

MAGNETIC RECORDING AND REPRODUCING

INVENTOR.
ALFRED L.W. WILLIAMS
BY
Elber J. Hyde
ATTORNEY

Patented Apr. 20, 1954

2,676,212

UNITED STATES PATENT OFFICE 2,676,212

MAGNETIC RECORDING AND REPRODUCING

Alfred L. W. Williams, Cleveland Heights, Ohio, assignor, by mesne assignments, to Clevite Corporation, Cleveland, Ohio, a corporation of Ohio Application August 20, 1948, Serial No. 45,287

3 Claims. (Cl. 179—100.2)

This invention relates to drive and control arrangements for magnetic transducing apparatus, and particularly to such apparatus which operates with a thin, flexible, reelable, elongated magnetic record track which is reeled from one reel onto another reel.

Among the objects of the invention are novel drive and control arrangements for magnetic record transducing apparatus of the foregoing type, which make it possible to impel the magnetic record track at a constant speed with an extremely simple and foolproof constant-speed drive structure; simple, foolproof reel drive and control arrangements which make it possible to drive the record track either at a low record-transducing speed or at a high speed for quickly reaching a portion of the record track; such apparatus which makes it possible to automatically bring about a re-winding of the record track after a record-transducing operation has been carried out on a predetermined length of the record track while it was impelled in one direction from one reel onto another reel; such apparatus, which makes it possible to carry on record-transducing operations along one trace of a magnetic record track such as a tape, while the magnetic record track is impelled in one direction, and on another trace while the magnetic record track is impelled in opposite direction.

Figure 1:
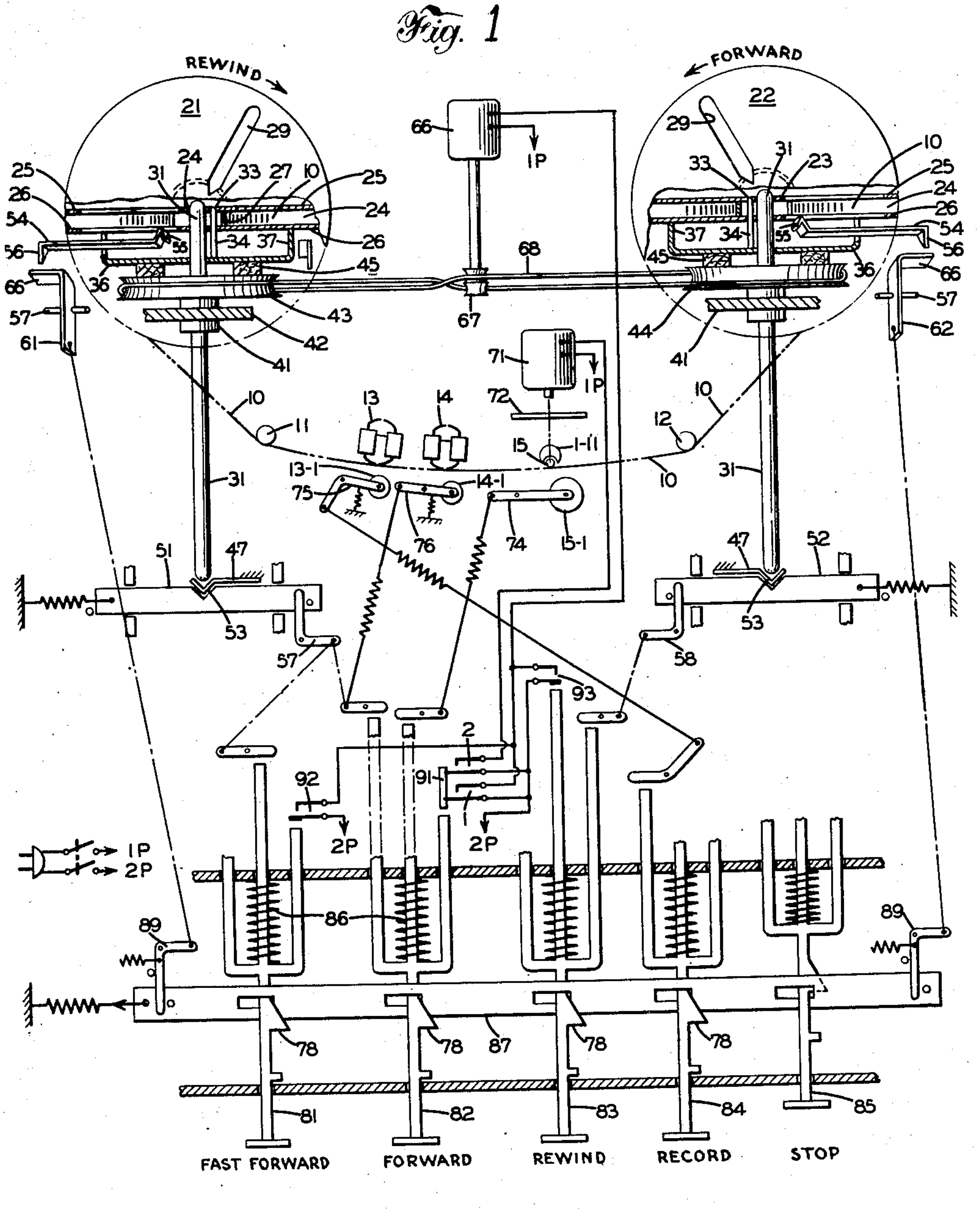

The foregoing and other objects of the invention will be best understood from the following description of exemplifications thereof, reference being had to the accompanying drawings, wherein:

Figure 1 is a simplified diagrammatic view illustrating the general relationship of the mechanical and electrical elements of record-transducing apparatus representing one form of the invention.

The magnetic record-transducing apparatus of the present invention has been evolved with the object of providing a simple and foolproof apparatus and control arrangements for recording magnetic records and for playing back magnetic records with high quality and fidelity on a thin, flexible magnetic record medium such as a paper or film coated with a thin stratum of permanently magnetizable material, and assuring that such magnetic record tapes may be reeled at low transducing speeds as well as high reeling speeds in a foolproof manner without subjecting the relatively weak tape to abnormal forces tending to break it or otherwise impair its desired operating characteristics. However, many features of the invention described herein are applicable for use with other recording media, such as thin filaments or wires.

Figure 1 illustrates in a simplified, diagrammatic manner, the general relationship of the magnetic and electrical elements of one form of a magnetic recording and reproducing apparatus of the invention designed specifically for operation with a thin, limp, elongated, magnetic record track made in the form of a tape, of paper, or plastic, or synthetic resin compound and provided on one or both exposed surfaces with a thin layer of uniformly dispersed permanently magnetizable powder. However, as pointed out above, the various features of the invention disclosed herein are applicable for use with other magnetic recording media, such as a filament or wire.

Figure 2:
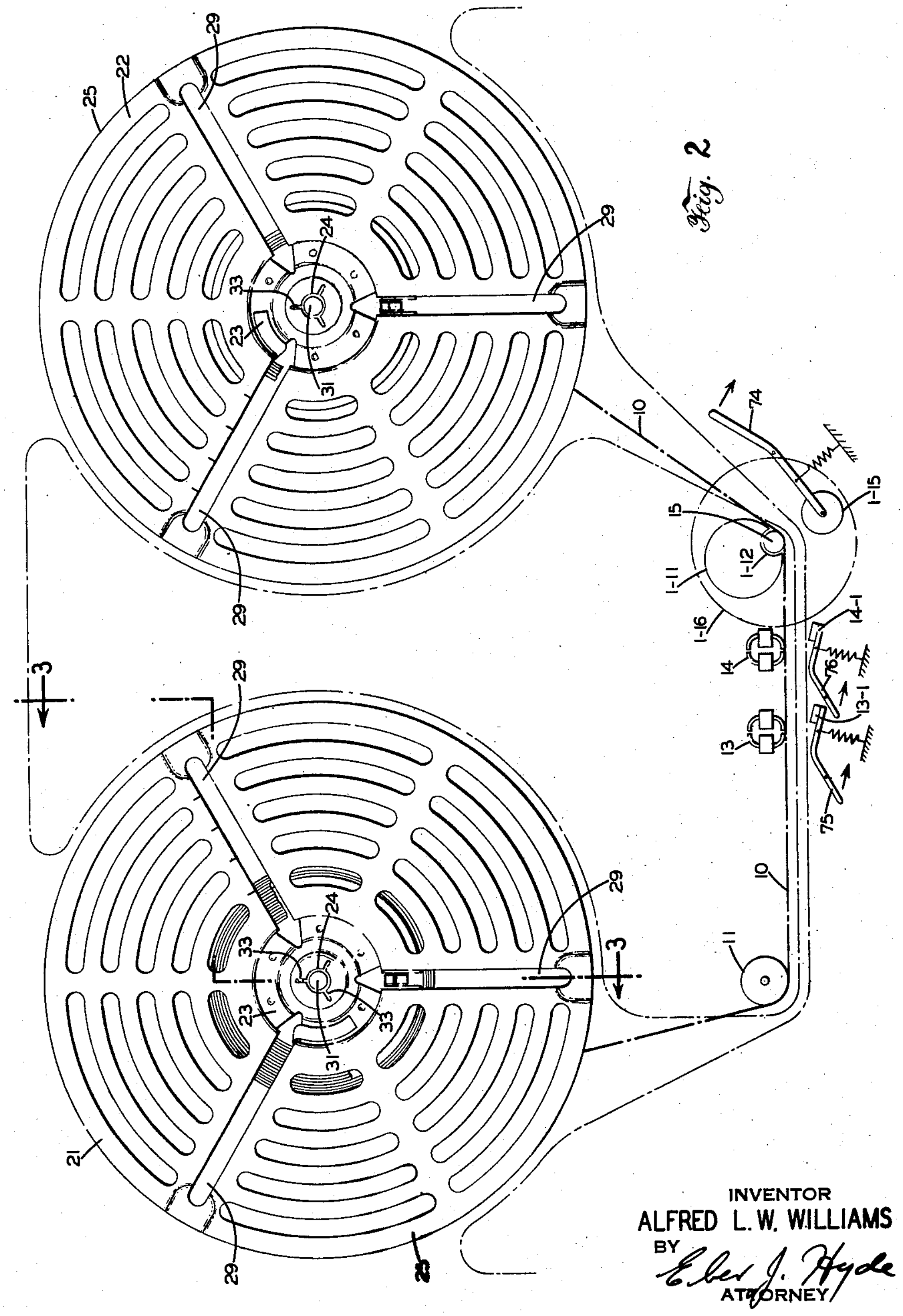

Figure 2 shows, partially in plan view and in part diagrammatically, some of the elements of the apparatus of Figure 1.

Figure 1 illustrates one form of the invention in which a record track 10 which may be in the form of a tape is led from a supply reel 21 over guides 11, 12, a magnetic erasing head 13, a magnetic recording-reproducing core 14, a capstan 15 and on to a take-up reel 22.

The reels 21 and 22 may be identical, having a central hub portion 23 with an opening 24 around which there is an annular record track receiving space bounded by two side walls for flanges 25 and 26 and a floor bottom wall 27. The record track 10 is held in coiled form in the record track receiving space of each reel. Forward reeling of the record track is shown as effected by rotation of the take-up reel 22 in the counter-clockwise direction as indicated by the Forward arrow. The record track is thereby wound up on the reel 22 as it unwinds from reel 21. The record track 10 may similarly be rewound back onto the reel 21 by rotating this reel in a clockwise direction as indicated by the Rewind arrow. The reel flanges 25, 26 are provided with slots 29 extending radially from adjacent the reel periphery toward the hub 23 through perforations in the floor 27.

This reel is sealed with its central opening 24 on one of two reel shafts 31 on which the reel is rotatably mounted. The hub of each reel 21, 22 may have one or more additional key slots 33 for receiving a drive pin 34 to effect its rotation. The radial reel slots 29 are useful for assisting in the anchoring to the reel of one end of the record track 10.

The space between the flanges 25, 26 may be quite small, of the order of a quarter inch when used with a record tape of about the same width. The inner portions of the radial slots 29 may also be used for admitting a sensing finger of a limit control assembly.

The reels are shown as supported in a generally horizontal position on a holder collar 36 secured to the shaft 31 and in the form of a plate having an upwardly dished flange 37 on which the reels are supported.

The shafts 31 are shown as longitudinally slidable in bearings 41 which may be held on a suitable support such as the stationary frame plate 42. Drive pulleys 43, 44 may be rotatably and non-slidably mounted on the bearings 41 and are provided with friction members or rings 45 so that by longitudinally sliding the shafts 31 down and up within the bearings 41 the reel support collars 37 may be lifted or released into frictional drive engagement with the respective drive pulleys 43, 44 and disengaged from the drive pulleys. The friction members 45 may be made of felt or other suitable friction material.

Below the lower ends of each reel shaft 31 is mounted a spring socket 47 suitably secured and held over slide members 51, 52 provided with a depression or notch 53 for receiving the spring socket 47. The slide members 51, 52 moving between the guides shown, are arranged to permit the downwardly biased spring socket to be received in the notch and disengage the shaft or to be cammed upwardly by the upper surface of the respective slide 51, 52 to lift the respective shaft 31 upwardly from driving engagement with its respective drive pulley 43, 44.

Each shaft 31 is biased downwardly as, for example, by the weight of the associated structure so that it maintains its collar 36 in frictional engagement with its respective drive pulley 43, 45 unless the shaft is held raised by the upwardly cammed shaft socket 47 and keeps its collar 36 disengaged from the pulley.

Each reel supporting collar 36 has supported thereon a limit member 54 provided with a sensing finger portion 55 shaped as shown and of a size suitable for passage through the reel slots 29 into engagement with the central or inner turns of record track 10 stored on the reels 21, 22. The limit lever 54 is pivotally held on the flange wall 37 of the reel support collar 36 and biased as by its own weight distribution or by additional bias springs so as to urge its sensing finger 55 upwardly into the reel slot 29. A very small amount of upward biasing force is all that is needed especially if the record track 10 is of the type having a paper or plastic base and a bonded stratum of permanently magnetizable particles.

The outer end of the limit lever 54 is shown as provided with a depending lip 56 having a sloping lower edge presenting on one side of the lip 56 a generally vertical striking edge. Below the striking lips 56 of the two limit levers 54 are pivotally mounted as at 57 two limit trip lever members 61, 62, each provided with a horizontally extending trip arm 66. Each trip arm 61, 62 and the associated strike lip 56 of the limit lever are so disposed that the tilting of a limit lever 54 in response to the upward travel of its sensing finger 55, causes the striking lip 56 to descend to the level of the trip arm 61, 62. As a result, rotation of the reel support collar 36 of reel 21 in the forward reeling direction (counter-clockwise) as seen in the figure will, with the limit lever lip 56 tilted downwardly, cause its vertical striking face to engage and move the trip arm 61, 62 of the trip lever around its pivot 57. Rotation of the collar roller and reel 21 in the rewinding direction will, with limit lever lip 56 tilted downwardly, permit its lower sloping surface to act as a cam engaging and riding over the trip arm 61, 62 of the trip lever without pivoting the trip lever to the trip position.

The limit element members associated with the take-up reel 22 operate in a similar manner except that the vertical striking edge 56 of its limit lever 54 is arranged to operate the trip lever 62 only when the take-up reel 22 is rotating in the rewinding direction.

The drive pulleys 43, 44 of the shafts 31 are driven by motor 66 which rotates a motor pulley 67 held in engagement with a crossover belt 68 looped around the reel pulleys 43, 44 so as to rotate the reel pulleys in opposite directions.

When the record track is impelled in a forward transducing operation its movement along the track guide path past the magnetic heads 13, 14 is under the control of the constant speed capstan 15.

The capstan drive is shown as including a constant speed motor 71 connected to rotate the capstan 15 made in the form of a thin shaft carrying a fly wheel 72. The record track is held against the capstan shaft 15 by a pressing or coupling member such as the coupling roller 15—1 mounted on an arm 74 movable around a pivot into and from an operated position in which it urges the coupling roller toward the capstan shaft 15. The roller arm 74 may be biased to the retracted position illustrated in Figure 1 and arranged for automatic operation by control apparatus as described below. Similar pressing or coupling members 13—1, 14—1 serve to couple and hold the record track 10 in stable and uniform magnetic contact with the magnetic cores of the respective heads 13, 14.

The reel control apparatus is shown comprising an assembly of push rods 81, 82, 83, 84 and 85 held between guides so as to permit the longitudinal movement of each rod between an inner operated position in which the Stop push rod 85 is shown, and an outer retracted position in which the other push rods are shown and towards which they are all biased, as by the springs 86. A biased latch bar 87 is also slidably mounted and provided with slots for receiving the push rods, the wall of the latch bar slots coacting with latch cams 78 on the push rods to hold inwardly operated rods in their operated position. Sliding of the latch plate against the urging of its bias will operate to unlatch the push rod cams 78 and cause the biasing spring 86 to retract any inwardly latched push rods. Sliding and unlatching motion is imparted to the latch bars by a cam 78 of an inwardly actuated control push and by tilting operation of the limit trip levers 61, 62 which are connected as by links to unlatching levers 89 which operate to shift the latch bar 87 to an unlatching position.

Inward operation of the respective push rods establish suitable transducing and reeling operations as indicated by the rods which are labelled as Fast Forward, Forward, Rewind, Record and Stop respectively. Linkages and switches are shown as positioned for actuation by extensions of the push rods to accomplish the various reeling and transducing controls.

Forward reeling of the record track for performing a record transducing operation is obtained by inwardly operating the Forward push rod 82. This push rod operates as through pivoted drive levers and links, a forward drive lever 57 as of coupling slide 51 and the capstan coupling. Upon actuation of lever 74 and a switch group 91, forward drive lever 57 moves the coupling slide 51 to the right, causing the supply reel shaft socket 47 to be raised and lift the shaft 31 and coupling collar 36 of the supply reel 21 out of engagement with its drive pulley 43. The coupling collar 36 of the take-up reel 22 remains engaged with its drive pulley 44, as shown. The control levers actuated by the forward push rod 82 also actuate the capstan coupling roller 15—1 and the transducing coupling roller 14—1 toward the coupling or pressing position in which they couple the tape 10 to the head 14 and capstan 15 respectively.

Actuation of the switch group 91 establishes power supply circuits for the motors 66 and 71 from a power supply having two conductors connected by means not shown to the leads 1P and 2P respectively. The switch group 91 includes contact 1 completing the power supply circuit to the capstan motor 71 and contact 2 completing a power circuit to the reel motor 66.

The inwardly actuated Forward push rod 82 thus establishes a constant speed reeling of the record track by the capstan as well as a take-up of the record track fed by the capstan on take-up reel 21. The motors 71 and 66 may be of a suitable low power such as substantially constant speed induction motors similar to those used in phonograph turntables, and the capstan may be driven by a synchronous motor. The torque of reel motor 66 acting through the large radius of the windings on the take-up reel should not be sufficient to supersede the control by the constant speed drive action of the capstan 15 in driving the tape 10 and need only be large enough to take up the record track as it is fed by the capstan.

Operation of the Fast Forward push rod 81 to its inward position closes switch 92 and actuates clutch lever 57 to operated position. The switch 92 supplies power to the reeling motor 66 and the clutch lever 57 actuates the clutch slide 51 so as to decouple supply reel 21 from its drive pulley 43. The coupling members 13—1, 14—1 and 15—1 remain retracted as long as the Forward push rod 81 is retracted. The link connection between the slide lever 57 and the associated push lever may be limp so that it operates only when under tension and the rotation of slide lever 51 to disengage the clutch will not cause operation of push rod lever of the forward push rod 82 and vice versa, although either push rod 81 or 82 will operate the slide lever 51. The Fast Forward push rod 81 accordingly produces a forward reeling of the record track 10 which is not slowed by engagement with the capstan or the magnetic head cores and is therefore at a speed much closer to the maximum speed at which the reeling motor 66 can drive the take-up reel. This high speed reeling may be as high as thirty or more times as fast as the slow forward impelling by the capstan.

Inward actuation of the Rewind push rod 83 closes switch 93 and operates rewind slide lever 58. Switch 93 energizes the reeling motor 66 and rewind slide lever 58 disengages the take-up reel clutch of the take-up reel 22 so that the record track is rapidly rewound from the take-up reel to the supply reel 21 at a speed which may be as high or higher than the fast forward reeling speed.

Operation of the Record push rod 84 to the inward operated position actuates the erasing head coupling member 13—1 to the coupling position and may also be arranged as by switches not shown to establish recording circuit connections from the magnetic head to suitable amplifying apparatus and sound transducers. When the Record push rod 84 is in the retracted position it will release its switches to establish playback circuits. The pressing or coupling action of the coupling members 13—1, 14—1 and 15—1 should be adjusted so that the added friction against the erasing head during recording does not significantly affect the transducing speed of the record track. If desired, however, the head couplings 13—1, 14—1 may be carried and actuated by the capstan coupling lever 74 so as to be actuated simultaneously with the capstan coupling roller 15—1 by the transducer control Forward push-roll member 82. The specific arrangement for switching the recording and playback circuits forms no part of the present invention and any switch construction may be used, as for example, that shown in the Dank application Serial No. 562,165, filed July 24, 1947, or the Lynch application Serial No. 773,636, filed September 12, 1947.

When the Stop push rod 85 is actuated to the inward position it merely operates as an unlatching means to cause retraction of inwardly latched operating push rods. Such retraction automatically terminates any reeling or transducing operation. If desired, however, the Stop push rod may be equipped with switches to control the power supply to any or all of the various components including the oscillator or amplifiers.

The limit control means operate to automatically terminate a reeling operation before the record track has left the reel at an intermediate stage of the reeling operation.

In forward reeling at low or high speed from a supply reel to a take-up reel, the mounting of the supply reel 21 containing record track on the supply reel coupling collar 36 causes the inner turns of record track on the reel to engage and tilt downwardly the sensing finger 55 of the limit lever 54 so that the outer end 56 of this lever is raised above the level of the trip arm 61. The limit lever 54 is so positioned with respect to the drive pin 34 and the drive pin slots in the reels that when a reel is properly mounted in driving engagement on its collar, the inner end of one of the reel slots 29 is positioned so as to permit engagement between the upwardly biased limit sensing finger 55 and the record track on the reel. When so much of the record track is unreeled from the reel that the turns holding the sensing finger down are removed, the sensing finger 55 moves up, tilting its limit lever 54 so that its trip end 56 descends to the level of the trip arm 61. During the forward reeling, the limit lever collar 54 of the supply reel 21 rotates in counterclockwise rotation (as seen in the figure) so that the limit lever trip end 56 strikes the trip arm 61 causing the trip member 61 to rotate around its pivot and by means of the link, or other connection, operate the left latch lever 89 of the control rod mechanism to move the latch bar 87 against its bias and into unlatching position and release any inwardly latched push rods, thereby automatically stopping the reeling.

The clutch arrangement may be adjusted so that engagement of the clutch is not accompanied by a downward movement of the limit lever support sufficient by itself to lower the outer trip end 56 of the limit lever 54 to the level of the trip arm 61. Such adjustment will avoid engagement of the drive clutch while the reel is rotating in the unwind direction as where the Rewind push rod is actuated before the forward reeling has stopped. Such operation of the controls assures that the Forward push rod becomes unlatched and retracted by its spring 86 permitting the slide 51 to be returned to the clutch-engaging position illustrated before rewinding can be started.

The limit controls for either reel is arranged to be non-responsive to reeling in the direction that winds record track on that reel. As shown, the trip ends 56 of the limit levers 54 have their lower edges tapered so that the commencement of rotation of the supply reel 21 and the take-up reel 22 in the rewind direction, for example, will, when insufficient record track is present to lower the sensing finger 54, merely cause the lip to cam itself up over the trip arms 61, 62 without moving the trip arms. Also the link connection of the trip arm 61 may be arranged for transmitting tension forces only so that even if the trip lever 61 is pivoted in the undesired direction, no unlatching of the latch bar 87 occurs.

The limit control structures of the take-up reel 22 mounting may be substantially the same as that on the supply reel 21, being arranged for response to unreeling of the record track in the Rewind direction only.

The sensing members 54 may be so positioned along a radius of the reels that it responds to the unreeling of any desired portion of the reeled record track. For example, the supply reel sensing member may respond to the unreeling of those record track tape turns some distance from the inner end so that the limit assembly stops forward reeling before the record tape is completely unreeled. This feature enables the rewinding to be simply effected after the end of a forward reeling without requiring a special operation to anchor the end of the record tape back on the supply reel.

The rewinding need not be arranged to terminate with the record track still anchored to the take-up reel since in many instances the rewinding is not followed by a re-transducing of the same record track. The higher rewind speed, however, permits a take-up sensing finger location similar to that shown above for the supply reel and makes such arrangement suitable for the application of reel-braking forces before the completion of the entire rewinding, as by the movement of the take-up clutch slide 52 under the actuation of the tripped limit control lever 62. The rapidly rotating take-up reel coupling collar 36 is accordingly urged into frictional engagement with the oppositely rotating friction pad 45, slowing the rewinding and diminishing the tendency for the free end of the rewound tape to flap around at high speed and become damaged after disengagement from the take-up reel.

The limit controls may be arranged, at least for the take-up reel, to respond to the complete unreeling of the record track.

Figure 3 illustrates such a construction in which the coupling collar 36—1 of the take-up reel 22 is provided with a limit lever member 54—1 pivotally mounted at 50—1 and having an upstanding limit finger 55—1 arranged to enter the winding space of a reel placed on the collar 36—1 and engage the inner turn of record track wound on the reel. The limit finger 55—1 may be outwardly biased as by the weight distribution of the limit lever 54—1 and/or by the centrifugal force developed during the unreeling. The outer end of the limit lever 54—1 is provided with a depending trip end or lip 56—1 similar to that of Figure 1 for similarly actuating the similar limit trip member 62 of the reeling control mechanism.

According to one phase of the invention, the operating controls are so arranged and interrelated that the termination of a forward reeling automatically begins a rewinding operation. This may be accomplished by merely interlinking the forward limit trip member 61 with the Rewind push rod 83 instead of the latch bar 87 so that tripping of the limit member 61 causes the Rewind push rod to move into its inward actuated position. Relay means may be utilized to magnify the limit control forces, if desired to more positively control the movement of the Rewind push rod or to perform the operation shown performed by the Rewind push rod.

Other satisfactory means for obtaining sequential reeling include an arrangement having an elongated sequence control spring, one end of which is connected to the Rewind push rod and the other end mounted for inward movement into a latched position by corresponding movement of the Forward push rod 82. Inward actuation of the Forward push rod will elongate and load the sequence spring urging the Rewind control rod inwardly against the latch bar 87 which keeps it from following the sequence spring. However, the release of the latch bar by the forward limit trip member 61 permits the sequence spring to pull the Rewind rod to its inward position at the same time unlatching the sequence spring, starting the rewind and setting the controls for termination of the rewinding by the take-up limit control.

As another variation, the sequence control spring as described above may be arranged for loading by the Record push rod 81 instead of the Forward push rod.

Alternatively, the Forward push rod 82 may be equipped with a second latch plate to hold it in a second inwardly actuated position. In the inner of the two actuated positions, this control rod may be arranged to produce slow forward reeling and in the intermediate position the rewinding. The forward limit control may then be connected to unlatch this control rod only from the innermost position and permit it to retract to the intermediate position from which it is released by the take-up limit control. A suitable unidirectional arrangement may be made for preventing rewinding while this control rod is moving inwardly past its intermediate and to its innermost position.

As a further aspect of the invention, the control elements for effecting the various reeling operations are arranged in the form of a rotatable control member provided with a dial having selected labelled control positions together with a set of cam lobes for selectively actuating the different control members such as the clutch slides 51, 52, the motor switches and the coupling or pressing members 74, 75 and 76 to the different operative positions. With such a construction, the limit controls may merely be connected to rotate the dial to the desired positions.

As in the arrangement of Figure 1, the sensing finger 55—1 of the limit member 54—1 is so shaped and biased that it is readily expelled from the record track receiving space of the reel by the winding of the record track onto the reel without damage to the record track. Similarly, the continuation of unreeling after the sensing finger 55—1 rises will permit the outward movement of record track past the sensing finger. This outward movement will lower the sensing finger, but will not reset the trip lever 62 from its tripped position.

During the transducing operations the speed of the record track 10 is maintained substantially constant by the frictional engagement with the capstan 15 which may be driven, for instance, by an induction type a. c. motor operated at the suitable speed to effect the desired rate of record track movement. Reducing the capstan 15 to a small diameter makes it possible to rotate it at a high speed, thereby securing high rotational inertia and constancy of rotation of the capstan 15. Reducing the capstan to a small diameter makes it also possible to drive it directly by a conventional high speed motor. Such thin, pencil-like capstan 15 is provided with a support having a groove for receiving and closely engaging the capstan shaft. The capstan support may be made of a self-lubricating bearing composition such as graphite or briquetted powdered bronze and graphite impregnated with an oily lubricant. To avoid the contamination of the record track by lubricant, the capstan support may be shaped so as not to contact the length of the capstan shaft which is engaged and contacted by the record track driven thereby.

Figures 4, 4-A and 4-B show one form of a novel, constant speed capstan arrangement of the invention. The capstan shaft 15 is quite thin, being of such thickness that when directly driven by the motor 71 it rotates at a speed at which its surface moves with a relatively low linear velocity so that it may be utilized for directly engaging and driving the record track 10. This eliminates all expensive and relatively large carefully machined parts that have been used heretofore in constant speed capstan drives. As an example, in a capstan drive of the invention such as graphite or briquetted powdered may be directly driven with a motor having a normal speed of about 1800 R. P. M. for imparting a linear speed of about 7 inches per second to magnetic record tape 10.

The thin capstan shaft 15 is revolvably mounted lengthwise of an exposed side of an elongated bearing member 1—11 which serves as a backing for the thin capstan. The capstan bearing member 1—11 is provided with an elongated bearing groove 1—12 which supports a major part of the length of the thin capstan 15. The bearing groove 1—12 may be arcuate or merely V-shaped.

As shown in Figs. 3, 8 and 8-A, the capstan coupling roller 73, which may have a slightly resilient periphery, is arranged to contact the capstan shaft 15 along a region of its rotation ahead of the point at which the record tape 10 first contacts it as it moves towards the take-up reel. The record tape 10 is accordingly pulled partly around the capstan shaft and its roller 73. In other words, the pressing engagement between the roller 73 and the capstan shaft 10 is at all times beyond the region at which the record tape first contacts the capstan as the track moves along in forward direction. This action assists in preventing riding of the record track up or down along the capstan shaft as it is driven by the capstan, due to any misalignment of the cylindrical surfaces.

As shown, the capstan bearing member 1—11 may be provided with a mounting flange 1—13 by which it is secured to its fixed support. The bearing flange 1—13 is provided with a hole which surrounds capstan 15 and provides it with a bearing region which is a continuation of the bearing groove 1—12. The thin capstan 15 is revolvably held in the bearing groove by one or more retaining collars or bands 1—14 which clampingly encircle the capstan 15 and its bearing support 1—11. The thin capstan 15 may be driven by securing its lower end, as by a press fit, to a coupling shaft 1—15 which may be quite short and may be placed close to the end of the support bearing 1—15. To the thicker coupling shaft 1—15 is secured a fly-wheel 1—16 which is carried in a self-aligning balancing position by flexible arms 1—17 of a mounting collar 1—18 affixed to the coupling shaft 1—15. The flexible collar arms 1—17 are connected to the fly-wheel by connector pins 1—19.

The coupling shaft 1—15 may be coupled to the drive shaft of the capstan motor by a flexible coupling member 1—21 such as a short length of rubber tubing, the ends of which securely engage the two shaft ends to which they may be clamped as by the clamping rings, if desired.

The entire capstan assembly may be simply held in place against the bottom side of frame member 1—23 of the apparatus by a bracket 1—24 secured as by means of screws to the frame member. The bracket 1—24 may also have secured thereto the capstan motor, as by screws. However, in general, it is desirable to interpose between the motor 71 and the bracket, vibration suppressing and absorbing elements so that the bracket is not subjected to any motor vibrations. The upper side of the mounting bracket 1—24 may also be provided with an offset section 1—25 which engages the flange 1—13 of the bearing member 11 and holds it in place in such a manner that it is self-aligning and requires no additional holding structures, such as matched accurately drilled screw holes in the frame member 22 and the bearing flange 1—13.

The entire capstan assembly is shown as substantially completely free of expensive and accurately machined structures. The bearing support 1—11 of the thin capstan 1—15 is self-aligning and can even be mounted slightly out of true with respect to the motor bearings, the flexible coupling 1—21 allowing for appreciable deviation in alignment. The coupling shaft ends of the capstan 1—15 and of the motor need not be accurately machined, the flexible coupling again accommodating inequalities of size or shape.

According to the invention, the fly-wheel 1—19 is made in a way which gives it substantially effective dynamic balance without careful machining. The fly-wheel 1—16 is formed of a plurality of like sheet members 1—26 each formed by identical operations, as for example, by stamping or punching out of sheet metal, and securing the several individual members in uniform rotationally displaced relationship into a composite flywheel. As shown, three sheets are used and held by three rivets 1—19, each sheet bearing an identically placed mark such as the notch 1—26 and assembled so that the notches are uniformly distributed around the periphery of the fly-wheel when the three rivet holes of each sheet member are aligned. Due to the relatively high speed of the capstan shaft and flywheel, a much lighter flywheel can be used.

Whereas the prior constant-speed capstan drives have been usually constructed with a roller provided with accurate bearing guides and a carefully balanced and extremely heavy flywheel and driven by means of an accurately finished friction drive having matched and non-interchangeable friction members, the only critical member of the novel capstan drive of the invention is the thin capstan shaft 32 which can be very inexpensively produced in great lengths, a very short portion of which may be cut off and used for each capstan.

The specific shaft dimension used may be selected to provide the desired record track speed when actuated by any selected drive. Since the thin capstan shaft drives the tape through a very small radial arm or speed reduction, the speed of the tape is not as easily affected by variation in drive loading. More uniform recordings result and the recordings are more freely interchangeable for uniform playback from different transducer apparatus.

Electrical relay and solenoid operating and control links may be used in lieu of the push rod controls and the mechanical operating links which are indicated in Figure 1 by dash lines extending between the clutch control elements 51, 52, the trip control elements 61, 62, the capstan coupling elements 73, the erasing and transducer head coupling elements 75, 76, and the control elements operated by the push rods or push buttons 81, 82, 83, 84 and 85 for operating and controlling a magnetic record in transducing apparatus in accordance with the principles of the invention described above.

The automatic limit trip levers 61, 62 may be utilized to operate or be replaced by trip switches which are automatically closed or opened each time an automatic limit tripping operation is performed. The clutch sliders 51, 52 may be combined or replaced by relays or solenoids which unclutch the reel coupling member 36 whenever the associated clutch actuating relay or solenoid is energized.

The capstan coupling roller 73 and the transducer head coupling element 76 may be actuated to the coupling position for coupling the moving tape against the capstan and the pole faces of the transducing head 14 by a relay or solenoid-operated operating arm. The relay operating arm for the capstan coupling member 73 and transducer head coupling member 76 may also be utilized to operate the erase head coupling member 75 to the coupling position, if a conventional erase head which is energized by erase current supplied to its winding, is used, in which case electrical circuits operated by appropriate push buttons complete the erase-head energizing circuit only when a recording or erasing operation is to be performed. If a permanent magnet erasing head is used, for instance, of the type disclosed in the Kornei Patent No. 2,594,934 issued April 29, 1952, the permanent magnet erasing head may be movably mounted and normally biased to retracted position and arranged to be brought to operative position, where it makes contact with each element of the record track 10 moving toward the recording head 14 whenever the apparatus is set to carry on recording operations.

The control push rods 81, 82, 83, 84 and 85 may be replaced by a set of control switch contacts arranged to be selectively actuated for a short moment, by a push button or a rotary selector, for selectively energizing an associated control relay having locking contacts which lock the relay in the operative position, and operating contacts which energize the appropriate operating relays or solenoids of the reel clutches, the capstan coupling roller 73, the transducer head coupling member 76, the erasing head coupling or positioning member, for selectively bringing them to the operative position in response to the selective actuation of the respective control buttons 81, 82, 83, 84 and 85 and bringing about the selective control actions described above in connection with Figure 1.

With such relay control arrangements, the limit trip control switches operated by the limit members 61, 62 and the stop button 85, merely have to open the locking circuits of one or the other of the several control relays associated with individual push buttons 81 through 84, for tripping and restoring the apparatus to the non-operated condition. Similarly, the limit trip switches may be utilized to automatically operate a re-wind control locking relay at the end of a forward transducing operation, so that each transducing operation is automatically followed by a re-winding operation which re-winds all or a part of the record track along which a transducing operation has been carried on, back onto the supply reel.

According to another phase of the invention, a magnetic recording apparatus of the type described above in connection with Figure 1, is utilized for recording on a long tape reeled between two reels, first along one trace extending, for instance, over one-half the width of the tape while the tape moves in one direction, and then on another trace extending over one-half of the width of the tape while the tape moves in the opposite direction. In such apparatus, one set of erasing and transducing head elements carry on recording and playback operations along one trace of the tape while it is reeled in one direction, for instance, from reel 21 onto reel 22, and another set of erasing head and transducing head elements for carrying on recording and playback operations along the other trace of the tape. The two sets of heads are automatically switched as the reeling operation is automatically erased when the end of the first trace operation is reached.

By providing such two-trace tape recording apparatus with electrical relay and solenoid operating and control elements as described above, it is merely necessary to make appropriate connections between the control and operating relays and solenoids for causing such apparatus to carry on—in accordance with the selective actuation of the control contacts—either a recording operation or a playback operation, first on one trace of the tape as it is reeled from reel 21 onto reel 22 until the end portion of the tape is reached, whereupon the limit trip member 61 operated by the limit elements of reel 21 will automatically actuate the associated trip switch to stop the reeling operation and follow it up with a reversed reeling operation in which the tape is reeled from reel 22 onto reel 21 while the transducing operation is continued along the other trace of the tape, the mechanism being automatically brought to a stop shortly before the full length of the tape has been reached on reel 21, or if desired, after the full length of the tape has been rewound on reel 21.

Such magnetic recording apparatus in which record transducing operations are automatically carried on first on one trace of the tape reeled in one direction, and then on another trace of the tape reeled in opposite direction, may be readily combined to operate with several two-trace tapes so that after a full length of a program has been played back from both traces of a first tape, the other tape is automatically set into operation for playing back a full program on both traces of the other tape, and so on, the first tape being set into operation after the programs of the other tapes have been played back in their desired sequence.

In the apparatus of the invention described in connection with Figure 1, the thin, shaft-like capstan 15 is shown driven directly by its own capstan motor 71. Such individual capstan motor drive is desirable whenever the tape is to be impelled at a constant speed in both directions, because it is merely necessary to use a reversible motor for driving the tape at a constant speed in one direction while carrying on transducing operations along one trace extending, for instance, on one-half of the tape, and then driving the tape back in opposite direction at a constant speed while carrying on record-transducing operations along a trace extending over the other half of the tape.

In simple home recorders, a single motor, such as motor 66 shown in Figure 1, may be utilized to drive both reels and also the thin capstan shaft 15. In such case, the capstan motor 71 is replaced by a pulley, and the pulley is driven by a belt from an additional pulley placed on the shaft of the reeling motor 66. In such arrangement, the reeling motor shaft 66 may be provided with a set of graded capstan drive pulleys of different diameters, and the capstan shaft may have mounted thereon a complementary set of different graded pulleys so that moving a drive belt from one set of cooperating pulleys of one speed ratio to another set of cooperative pulleys of a different speed ratio, the same apparatus may be used to record the signals on a tape moving at a relatively high speed, for instance, twelve or eighteen inches per second for recording or playing back a half-hour program with a high degree of fidelity, or for driving the recording tape at a low constant speed, for instance, only four inches per second, for recording or playing back with the same length of tape a much longer program, for instance, conference proceedings lasting several hours.

Figure 5:
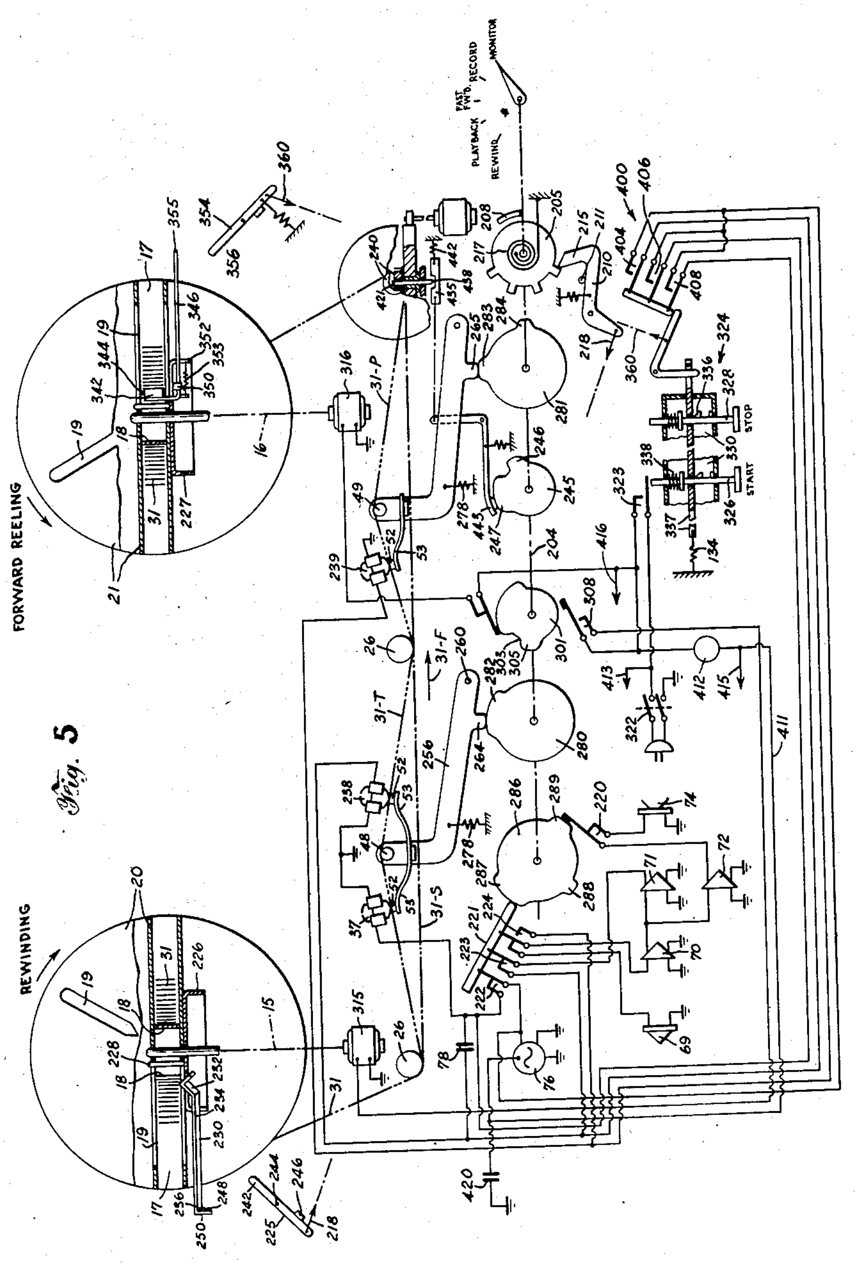

In Figure 5 is described a modified form of operating and control arrangement of a magnetic recording apparatus of the invention in which a single settable control member operable to different setting positions has a plurality of cam surface lobes for controlling the operation of a recording apparatus generally similar to that described in connection with Figure 1. Although the apparatus described in connection with Figure 5 is shown provided with a conventional capstan and two separate reeling motors for each shaft, which are selectively actuated and energized by the controls, the operating controls described hereinafter in connection with Figure 5 may be readily used for selectively controlling the operation of a recording apparatus having a clutch reeling control and thin capstan shaft drive and coupling member of the type described above in connection with Figures 1 to 4.

In the magnetic record transducing apparatus of Figure 5, the record track 31 is arranged to move in the forward direction, indicated by the arrow 31–F, along a plurality of alternate paths indicated by the dash-double-dot line 31–S, the dash-triple-dot line 31–T and the dash-quadruple-dot line 31–P along which it may be impelled to move along the guide rollers 26, 26, a capstan roller 240 and erasing, recording and playback magnetic cores 37, 238 and 239 respectively.

Along the path 31–S, the record track is shown as moving at some distance from and out of magnetic linkage with the cores. A deflecting guide 48 which may be a fixed surface or a roller mounted on a deflecting arm 256 pivotally held as at 260 and having a cam follower portion or toe 264 mounted for operation by a cam 280, to bring the record track moving between the guides 26 to track path 31–T and maintain it in magnetic linkage with the cores of the magnetic erasing head 37 and the magnetic recording head 238. Another deflecting guide 49 is also shown on an arm 257 having a toe 265 for operation by a cam 281 to bring the record track moving between the intermediate guide 26 and the capstan roller 240 to the guide path 31–P so that the record track is magnetically linked with the magnetic core of the magnetic playback head 249.

The two cams 280, 281 may be arranged for simultaneous actuation as by the rotation of a selector knob 290 held on the cam shaft 204, and have projecting cam lobes 282, 283, 284 for engaging the toes 264, 265 and moving the arms against the action of biasing means, such as the springs 278.

The magnetic head cores are shown as having their windings connected to the various transducing elements, amplifiers, oscillator, etc. by means of the switch 220 and the switch assembly 221 under the control of another cam 286 provided with cam lobes 287, 288 and 289 and connected for actuation together with cams 280 and 281.

The selector knob 290 is shown as rotatable into different control positions for rewinding, playback, fast forward reeling, recording or monitoring as indicated by the legends. The knob may be held in place by the latch gear 205 held on the cam shaft 204 and having teeth 207 engaged by a latch member, such as the pivoted latch lever 120 biased as by spring 212 toward a latching position defined by a stop 211. The cam shaft assembly may be biased as by the spring 217 to urge the selector in a counter-clockwise direction toward the rewind position. The nose 215 of the cam, however, is so shaped with respect to the teeth 207 as to resist such counter-clockwise rotation while permitting clockwise rotation of the teeth by manual operation of the selector knob 290, for example. Manual rotation of the selector knob in a counter-clockwise direction may be provided as by mounting the gear 205 and knob 290 so that they are slidable along their axis of rotation, and the knob may be axially moved to bring the cam 205 away from the plane of and out of engagement with the latch lever. Other techniques for permitting manual counter-clockwise control include the provision of conventional clutch means between the selector knob and the gear 205 so arranged that whenever rotatory power is transmitted from the selector knob to the gear the knob first moves through a lost motion range during which the clutch automatically moves the gear axially away from the plane of the latch or vice versa. As another alternative, the teeth 207 and latch nose 215 may be so shaped that the manual operation of the knob 290 can force the latch nose out against the latch bias to permit gear rotation, whereas the urging of the shaft bias 217 is insufficient for overriding the latching action.

The number of teeth 207 on the gear 205 need not be larger than one less than the number of control positions, as shown, a fixed stop 208 being for defining the limiting positions.

The latch 210 is shown as connected by link 218 to a forward reeling limit lever 225 arranged for actuation when the unreeling of the record track from the supply reel is nearly completed. The supply reel 20 is supported by a collar or table 226 and is provided with one or more slots 19, located adjacent the floor 18 of the record track receiving space 17 as well as drive connections, such as perforations, for receiving the top of the drive shaft 15 and a drive pin 228 extending up from the collar 226. Pivotally supported on the collar is shown a sensing member 230 having at its inner portion a sensing finger 232 positioned under an aperture 234 in the collar and biased upwardly, as by the distribution of its own mass, toward the reel 20. The reel slots 19 may be so related to the drive pin engagement that the mounting of a reel automatically positions a slot 19 over the sensing finger 232.

The outer end of the sensing member 230 is shown as provided with a depending lip 236, which when lowered by the upward movement of the sensing finger, will rotate with the collar 226 in a generally horizontal plane to strike the nearer end 242 of the limit member 225 which may in turn be pivoted as at 244 and biased toward a stop 246. When a portion of the inner turns of record track on the reel 20 obstruct the upward movement of sensing finger 232, the lip 236 is retracted above and out of reach of the limit member 225. The sensing finger may be positioned to move upwardly to cause tripping of the limit lever and cessation of unreeling with one or more anchoring turns of record track on the reel 20 so that a rewinding operation may be immediately started without the necessity of securing the record track end back on the supply reel 20.

The lip 236 and/or the limit member 225 may be provided with tapered surfaces for permitting their engagement during their engagement during rewinding to lift the lip over the limit member end 242. As shown, this may be accomplished by shaping the lip with a sloping face 246 on the edge which advances during forward reeling having a vertical face 250.

The limit lever 225 and the latch 210 are so interlinked that tripping of the lever 225 by the lip 236 disengages the nose 215 of latch 210 from the teeth 207 of gear 205 permitting the bias 217 to return the shaft 204 with all its cams to the limiting counter-clockwise or rewind position as defined by a suitable stop, such as stop 208.

Another cam 245 containing lobes 246 and 247 is also shown as provided on the shaft 204 to control the operation of the capstan roller 240. In the form illustrated, the capstan roller is revolvably mounted as by the bearing 419 on a longitudinally slidable shaft 421. A flywheel 430 is also revolvably mounted as by bearing 431 held on a support 433 so that its control portions are adjacent the surface of the capstan roller.

The lower end of shaft 421 is illustrated as coacting with a slide 435 having a notch 438 so positioned that the lower end of shaft 421, which is downwardly biased, either drops into the notch or is cammed upwardly by the tapered side walls of the notch. The flywheel 430 may be impelled as by the motor 317 driving the roller 439 in frictional engagement with the periphery of the flywheel. The relatively large mass of the flywheel imparts a high inertia to the rotation and any vibrations originating in the power source may be eliminated by establishing a resilient frictional driving connection between the roller 439 and flywheel 430 as by providing either with a rubber-tired drive surface.

The slide 435 is shown as linked to a cam follower 441 having a toe 443 urged as by bias 442 into engagement with the cam 245. Under the actuation of this cam the slide 435 may be moved to permit the end of shaft 421 to drop into the notch 438 and lower the capstan roller 240. The adjacent surfaces of the capstan roller and the flywheel are so spaced that the dropping of the shaft 421 into the notch 438 brings the capstan roller into frictional driving engagement with the flywheel. If desired, this driving engagement may be made by means of a friction disc, such as a felt pad 445, positioned intermediate the engaging surface.

When frictionally engaged the capstan roller is driven at the desired record track impelling speed. The lifting of the shaft 421, as by engagement of the toe 443 with a low region of the cam 245, lifts the capstan roller out of engagement with the massive flywheel to permit movement of the record track along its guide path without the burden of the high inertia, as for example, when a high speed reeling is to be effected. The capstan motor is arranged to be energized as required to impel the record track during a transducing operation. An additional cam or circuit connection may be provided for closing the energizing circuit to this motor at the proper positions of the control elements.

As diagrammatically illustrated, another cam member 301 on the cam shaft 204 has two cam lobes 303, 305 arranged for operating switches 308 and 310 connected to establish power circuits to the reeling motors 315 and 316 respectively. These motors may be directly connected to the shafts 15 and 16 on which the supply and take-up reels are respectively mounted, as indicated. Power to these motors may be supplied by the ordinary electric power lines, through the plug-in connector 320, On-Off switch 322 and switch 323.

The B+ D. C. power supply circuit to the oscillator 76 as well as the amplifiers may also be arranged for control by switch 323, as indicated by connectors 411, and the rectifier 412 fed from the output of the switch.

The switch 323 is also shown as coacting with the control assembly 324 illustrated as including a pair of push rods 326, 328 labelled Start and Stop, respectively, slidably held in a frame 330 and interlinked by a latch plate 332 laterally slidable with respect to the push rods and biased as by spring 334 to engage cam projections 336 on these rods. Both rods are biased outwardly as springs 338 and the switch 323 is biased to open position and arranged to be closed by inward actuation of the Start push rod 326 to establish the motor circuits to the switches 308 and 310.

Inward actuation of either push rod causes its cam projection 336 to engage an adjacent edge 337 of the latch plate and move the plate to the right against its bias. When the inward actuation has proceeded far enough to move the cam projection beyond the latch plate, the plate is automatically retracted to hold the push rod and keep it from moving out under the influence of the rod bias 338. Inward movement of either rod moves the latch plate to the right and unlatches an inwardly held rod.

To start a reeling operation, the Start push rod is actuated after the selector knob is positioned in the desired setting. This causes the actuation of either the supply reel motor 315 for rewinding or the take-up reel motor for forward reeling. Inward actuation of the Stop push rod 328 unlatches the Start push rod and permits switch 323 to open and stop the reeling.

In the construction illustrated, the take-up reel 21 is also provided with a reeling limit control for terminating a reeling operation when the record track is completely unreeled from the reel. As shown, this reel may be mounted in a manner similar to that shown for the supply reel 20 and the limit control may be of a generally similar nature. For reasons more fully set forth below the take-up reel limit control is shown as including a sensing finger 342 which projects from the take-up reel collar 227 and enters the inner regions of a slot 19 and engages the innermost turn of record track through a passageway 344 in the floor 18 of the record track receiving space 17.

The sensing finger 342 is shown as held on a sensing member 346 slidably positioned on the collar as by means of a lug 350 and a passageway 352 in the collar. The sensing member 346 may be outwardly biased as by spring 353 or the centrifugal force developed during rotation which for rewinding may be of a relatively high speed.

In the general plane of the outer end 355 of the sensing member 346 is mounted the end 356 of a limit member 354 in such position as not to obstruct the end as the slide 346 in the inward position in which it is held by the engagement of the finger 342 and the inner turn of record track rotates with the collar 227.

The limit member is shown as connected by link 360 with an unlatching lever 362 pivotally mounted to engage the latch plate 337 as by means of the pin 364. When during a reeling the Start push rod is in its inward position and the limit member 354 is tripped by the end 355 of the sensing slide 346, the latch plate is automatically moved to the right to permit the push rod bias to retract the Start rod and allow the switch 323 to open to stop the reeling.

The apparatus also has a switch assembly 400 containing a group of switches 404, 406 and 408 automatically actuated by the unlatching lever 360 when the rewind limit member 354 is tripped.

Switches 404, 406 and 408 are shown in this construction as connecting the windings of the different cores with the high frequency output of the oscillator 76. In the form shown, the assembly 400 is so disposed that actuation of the lever 360 first closes the switches 404, 406 and 408 and then, after a lag which may be only momentary, unlatches the Start rod 326 and opens the switch 323. The closing of switches 404, 406 and 408 supplies alternating currents of large peak magnitudes to the core windings to insure substantial saturation of the cores. The opening of switch 323 interrupts the B+ power supply and the inherent capacitance on the oscillator side of the switch 323 then discharges its stored energy so that the oscillator output dies out more gradually. An additional capacitor 420 may be shunted across the D. C. power line, as shown, to improve the decay characteristics if desired.

I claim:

1. A magnetic record transducing apparatus comprising: a pair of spaced apart supply and take-up reels; an elongated permanently magnetizable record track having end portions coiled on said reels and an intermediate track portion extending along a guide path between the reels; a magnetic record transducing head adjacent the guide path for magnetic flux linkage with successive elements of the record track moving along said path and carrying magnetic flux variations corresponding to the record signals; impelling means for selectably applying rotating forces to the reels for selectably coiling up the track on either reel and unwinding it from the other; said impelling means forming part of actuating apparatus including a single manually operable selector element selectably movable into different operating positions to effect a forward reeling step for unwinding record track from one of the reels acting as a storage reel, or a rewinding step for recoiling the track on said storage reel; said impelling means also including limit means mounted adjacent said supply reel for rotary motion therewith and responsive to the depletion of the record track on said supply reel to a given point; and means connecting said limit means to said selector elements for automatically controlling the record track reeling through a sequence of a plurality of reeling steps when the quantity of record track on said supply reel is depleted to said given point.

2. A magnetic record transducing apparatus as claimed in claim 1 in which the actuating apparatus includes an auxiliary manually operable control movable to place the apparatus in condition for recording.

3. A magnetic record transducing apparatus as claimed in claim 1, in which the selector element includes an auxiliary manually operable control movable to place the apparatus in condition for recording.

References Cited in the file of this patent

UNITED STATES PATENTS

| Number | Name | Date |
|---|---|---|
| 1,155,776 | Washburn | Oct. 5, 1919 |
| 1,560,721 | O'Reilly | Nov. 10, 1925 |
| 2,069,721 | Thomas | Feb. 2, 1937 |
| 2,071,192 | Younts | Feb. 16, 1937 |
| 2,266,755 | Herzig | Dec. 23, 1941 |
| 2,535,486 | Dank | Dec. 26, 1950 |
| 2,535,498 | Kornei | Dec. 27, 1950 |
| 2,538,893 | Begun | Jan. 23, 1951 |
| 2,549,834 | Mayle | Apr. 24, 1951 |

FOREIGN PATENTS

| Number | Country | Date |
|---|---|---|
| 45,472 | Netherlands | Apr. 15, 1939 |
| 63,189 | Norway | Feb. 3, 1941 |